(12) United States Patent
Boese et al.

(10) Patent No.: US 10,024,987 B2
(45) Date of Patent: Jul. 17, 2018

(54) NEUTRON DETECTOR

(71) Applicant: Honeywell Federal Manufacturing & Technologies, LLC, Kansas City, MO (US)

(72) Inventors: Christopher A. Boese, Pleasant Hill, MO (US); George Bohnert, Harrisonville, MO (US)

(73) Assignee: Honeywell Federal Manufacturing & Technologies, LLC, Kansas City, MO (US)

(*) Notice: Subject to any disclaimer, the term of this patent is extended or adjusted under 35 U.S.C. 154(b) by 31 days.

(21) Appl. No.: 14/600,225

(22) Filed: Jan. 20, 2015

(65) Prior Publication Data

US 2016/0209526 A1  Jul. 21, 2016

(51) Int. Cl.
| | | |
|---|---|---|
| *G01T 3/08* | (2006.01) | |
| *G01T 3/00* | (2006.01) | |
| *G01T 7/12* | (2006.01) | |

(52) U.S. Cl.
CPC ............. *G01T 3/08* (2013.01); *G01T 3/00* (2013.01); *G01T 7/12* (2013.01)

(58) Field of Classification Search
CPC .............. G01T 3/08; G01T 3/00; G01T 7/12
USPC ............................ 250/390.01, 370.05, 391
See application file for complete search history.

(56) References Cited

U.S. PATENT DOCUMENTS

| | | | | |
|---|---|---|---|---|
| 1,692,074 A | * | 11/1928 | Burtis ..................... | H03H 3/02 310/364 |
| 3,912,830 A | * | 10/1975 | Murayama ............. | H01G 7/023 29/25.35 |
| 4,365,159 A | * | 12/1982 | Young ................. | H01J 47/1244 250/385.1 |
| 4,419,578 A | * | 12/1983 | Kress ........................ | G01T 3/08 250/370.04 |
| 4,493,811 A | * | 1/1985 | Seki ..................... | G21C 17/108 376/254 |
| 4,613,758 A | * | 9/1986 | Ing ............................ | G01T 1/04 250/390.03 |
| 7,902,517 B1 | * | 3/2011 | Ianakiev .................. | G01T 3/08 250/390.01 |
| 8,240,911 B1 | * | 8/2012 | Pfeifer ................. | G01K 11/265 374/117 |

(Continued)

*Primary Examiner* — David Porta
*Assistant Examiner* — Blake Riddick
(74) *Attorney, Agent, or Firm* — Hovey Williams LLP

(57) ABSTRACT

A neutron detecting system and method. The neutron detecting system may include one or more coated substrates including a piezoelectric substrate having a first surface and a second surface opposite of the first surface, a coating of $^{10}$boron ($^{10}$B) on the first surface, and a conductive backplane deposited on the second surface. The coated substrates may be stacked to form a stacked layer array. When the neutrons are captured by the coating of $^{10}$B on the coated substrates, energy will be released, causing crystal dislocation of the piezoelectric substrate, thus producing an electric signal through the conductive backplane of the coated substrates. The electric signal may be received with an amplifier to produce an amplified electric signal provided to a processor or circuitry. The processor or circuitry may send a notification signal to a visual or audible user interface indicating detection of the neutrons.

17 Claims, 2 Drawing Sheets

(56) References Cited

U.S. PATENT DOCUMENTS

| | | | | |
|---|---|---|---|---|
| 8,596,862 B1* | 12/2013 | Pfeifer | ............... | G01K 11/265 |
| | | | | 374/117 |
| 2004/0084690 A1* | 5/2004 | Dowben | ............ | G01T 1/2985 |
| | | | | 257/183 |
| 2004/0164250 A1* | 8/2004 | Cork | ..................... | G01T 1/244 |
| | | | | 250/390.06 |
| 2004/0178337 A1* | 9/2004 | Kurkoski | ............... | G01T 3/08 |
| | | | | 250/269.4 |
| 2011/0284755 A1* | 11/2011 | Stradins | ................ | G01T 3/08 |
| | | | | 250/370.05 |
| 2012/0014491 A1* | 1/2012 | Deeth | ................ | G21B 3/008 |
| | | | | 376/103 |
| 2013/0075718 A1* | 3/2013 | Nause | .................... | G01T 3/06 |
| | | | | 257/43 |

* cited by examiner

NEUTRON DETECTOR

BACKGROUND

Neutron detectors may be used in the fields of law enforcement, national security, dirty bomb detection, and the like. Neutron detectors may be particularly useful in detecting the presence of radioactive materials.

Typical neutron detector devices rely on scarce $^3$helium or toxic gas such as $BF_3$ for operation. Unfortunately, these materials can be difficult to obtain and/or expensive.

SUMMARY OF THE INVENTION

Embodiments of the present invention solve the above-mentioned problems and provide a distinct advance in the art of neutron detectors. One embodiment of the invention provides a neutron detector with piezoelectric substrate having a first surface and a second surface opposite of the first surface, a neutron-capture coating on the first surface, and a conductive backplane on the second surface. The conductive backplane carries an electric signal generated by the piezoelectric substrate when one or more neutrons strike the neutron-capture coating.

In another embodiment of the invention, a neutron detecting system may include a stacked layer array, a processor and/or circuitry electrically coupled to the stacked layer array, and an anodized aluminum housing. The stacked layer array may have a plurality of coated substrates, and two or more of the coated substrates of the stacked layer array may include a piezoelectric substrate having a first surface and a second surface opposite of the first surface, a coating of $^{10}B$ on the first surface, and a conductive backplane deposited on the second surface. The processor and/or circuitry may be electrically coupled to at least one of the conductive backplanes. The anodized aluminum housing may surround the stacked layer array and the processor and/or circuitry.

In yet another embodiment of the invention, a method of neutron detection may include the steps of receiving neutrons with a stacked layer array having a plurality of coated substrates. One or more of the coated substrates may include a piezoelectric substrate having a first surface and a second surface opposite of the first surface, a coating of $^{10}B$ on the first surface, and a conductive backplane deposited on the second surface. The method may also include, when the neutrons strike the coating of $^{10}B$, a step of transferring released energy to the piezoelectric substrate, causing crystal dislocation of the piezoelectric substrate, thereby producing an electric signal through the conductive backplane. The method may also include the steps of receiving the electric signal with an amplifier to produce an amplified electric signal, and receiving the amplified electric signal with a processor or circuitry. Then, the method may include a step of sending a notification signal to at least one of a visual or audible user interface from the processor or circuitry indicating detection of the neutrons with the stacked layer array.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein.

Figure 1:
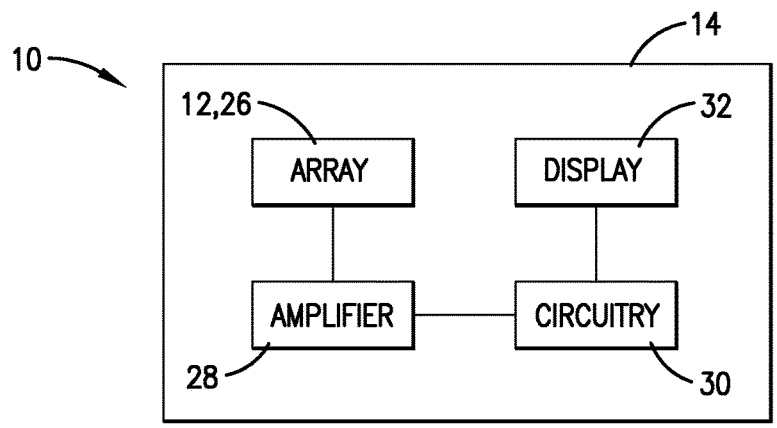
FIG. 1 is a schematic view of a neutron detector constructed according to embodiments of the present invention.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Figure 2:
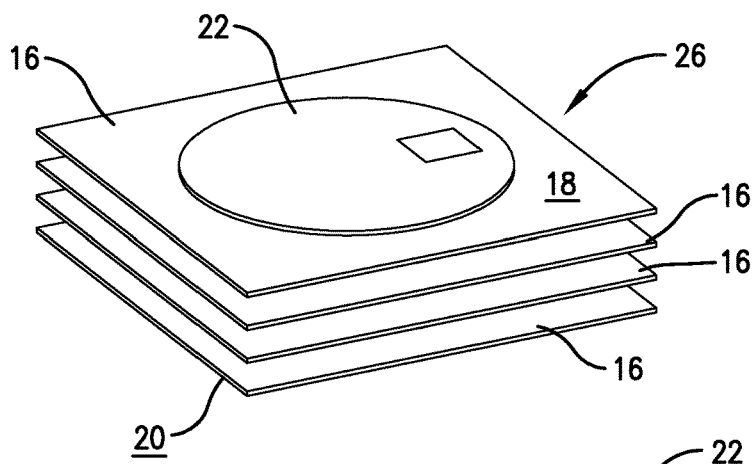
FIG. 2 is an exploded three-dimensional view of a stacked layer array of the neutron detector of FIG. 1.
Figure 3:
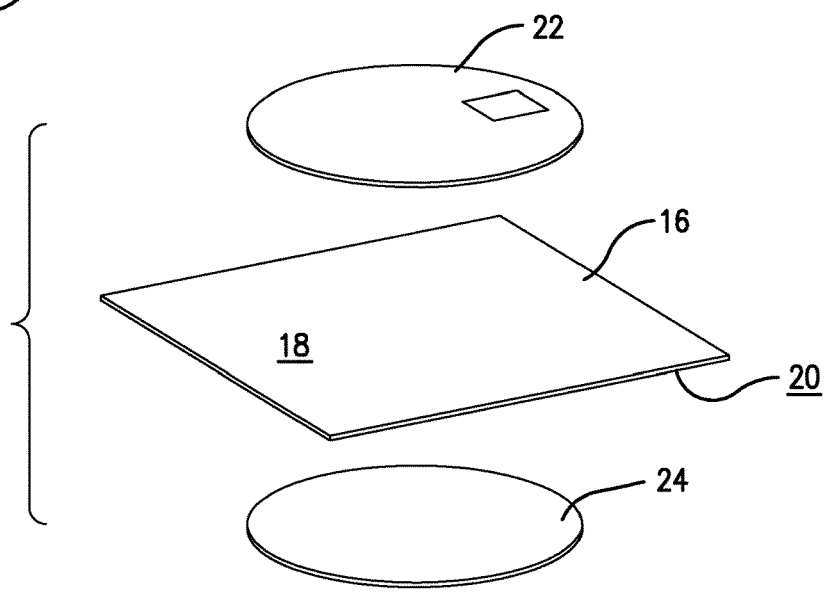
FIG. 3 is a cross-sectional view of one coated substrate of the stacked layer array of FIG. 2.

A neutron detecting system 10, constructed in accordance with embodiments of the present invention, is shown in FIGS. 1-3. Embodiments of the invention are configured for detecting neutrons and notifying a user or another system when the neutrons are detected.

The neutron detecting system 10 (or neutron detector) may specifically include a coated substrate 12, as illustrated in FIGS. 2-3, housed in an anodized aluminum housing 14, as illustrated in FIG. 1. The coated substrate 12 may include a piezoelectric substrate, a neutron-capture coating, and a conductive backplane. More specifically, as illustrated in FIGS. 2-3, the coated substrate 12 may include a piezoelectric substrate 16 having a first surface 18 and a second surface 20, a coating of $^{10}$boron ($^{10}B$) 22 deposited on the first surface 18, and a conductive backplane 24 deposited on the second surface 20. In some embodiments of the invention, the piezoelectric substrate 16 may comprise films, crystals, or any other known piezoelectric materials, such as a highly polarized polyvinylidene fluoride (PVDF) film or lithium niobate (LiNbO$_3$) crystals. The conductive backplane 24 may be formed from aluminum, copper, graphene/boron nitride, gold, silver, and/or other highly conductive materials. The thickness of the piezoelectric substrate 16, the $^{10}$B coating 22, and/or the conductive backplane 24 may vary depending on source exposure and application desired.

The piezoelectric properties of PVDF film and other possible substrates are well known in the art. Specifically, the piezoelectric nature of PVDF is due to fluorine atoms and their strong electronegativity coupled with the piezoelectric substrate's ability to be oriented in such a way that there is a strong potential differential. When thermal neutrons strike the $^{10}$B coatings described herein, the following reaction will occur:

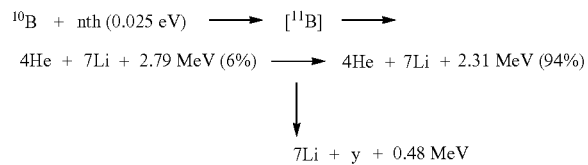

The resulting energy released may be transferred to the highly ordered PVDF film, causing crystal dislocation in the PVDF film and producing an electric signal, as described in more detail below.

In some embodiments of the invention, the neutron detecting system 10 may further comprise a stacked layer array 26 having a plurality of coated substrates 12. The coated substrates 12 may be stacked one on top of another, such that the first surface 18 of one coated piezoelectric substrate 16 faces the second surface 20 of an adjacent coated piezoelectric substrate 16. Specifically, the $^{10}$B coatings 22 may all face a first direction and the conductive backplanes 24 may all face a second direction, opposite of the first direction. The size, shape, and configuration of the neutron detecting system 10, the coated substrates 12, and/or the stacked layer array 26 may vary and/or may be customized for various applications.

In some embodiments of the invention, at least one of the coated substrates 12 of the stacked layer array 26 may comprise only the piezoelectric substrate 16 and the conductive backplane 24 on the second surface 20 of the piezoelectric substrate 16, without the $^{10}$B coating 22 on the first surface 18. For example, at every fifth or tenth coated substrate 12, there could be one coated substrate 12 without the $^{10}$B coating 22 on the first surface 18. This may advantageously dampen, reduce, or filter background noise or unwanted manual vibrations experienced by the stacked layer array 26.

The coated substrate 12 and/or the stacked layer array 26 may be positioned in the anodized aluminum housing 14 in order to reduce background interference as well as other particle interference, such as photons, gamma radiation, or alpha radiation. Specifically, the anodized aluminum housing 14 may allow the neutrons to pass therethrough, but create a black body effect to prevent other unwanted particle interference.

As illustrated in FIG. 1, the neutron detecting system 10 may further comprise an amplifier 28 electrically coupled with the conductive backplane 24 of one or more of the coated substrates 12, a processor and/or circuitry 30 electrically coupled to the amplifier 28, and a user interface 32 coupled to the processor and/or circuitry 30. The amplifier 28 may be configured to amplify an electric signal produced by the piezoelectric substrate 16. Specifically, a silver-filled epoxy or glue may attach a conducting wire to the conductive backplane 24 of at least one of the coated substrates 12. This conducting wire may then be attached to an input of the amplifier 28. Other suitable standard connection apparatuses and methods for electrically coupling the conductive backplane(s) 24 to the amplifier 28 may be used without departing from the scope of the invention. An output of the amplifier 28 may be provided as input to the processor and/or circuitry 30.

The processor and/or circuitry 30 may comprise any analog or digital circuits, computer processors, microcontrollers, microprocessors, wires, filters, and the like known in the art. One or more signals indicating neutron detection may be provided by the processor and/or circuitry 30 to the user interface 32 via an electrical connection therebetween. The processor and/or circuitry 30 may be configured to filter the amplified electric signal from the amplifier 28 and/or perform various calculations using the amplified electric signal. For example, in some embodiments of the invention, signals received by the processor and/or circuitry 30 may be interpreted on the order of magnitude in which they are generated. In some alternative embodiments of the invention, the amplifier 28 may be omitted and/or integral with the processor and/or circuitry 30 without departing from the scope of the invention.

The user interface 32 may be any device configured to provide visual and/or audible indication of neutron detection to a user of the neutron detecting system 10. In some embodiments of the invention, the user interface 32 comprises a display electrically coupled to the processor and/or circuits and may be mounted to the anodized aluminum housing or otherwise located to be viewable by an operator of the neutron detecting system 10. The display may be configured to light up and/or display information, graphics, charts, text, and the like to an operator of the neutron detecting system 10. In some embodiments of the invention, the display may comprise an LCD (Liquid Crystal Display) display, a TFT (Thin Film Transistor) LCD display, an LEP (Light Emitting Polymer) or PLED (Polymer Light Emitting Diode) display, LEDs, and so forth. The display may be backlit via a backlight such that it may be viewed in the dark or other low-light environments. In other embodiments of the invention, the user interface 32 may comprise a speaker housed within the anodized aluminum housing and configured to provide an audible notification of neutron detection.

In some alternative embodiments of the invention, the user interface 32 may be an electrical and/or communication connection from the neutron detecting system 10 to another external system, computer, display, or the like. Furthermore, the processor and/or circuitry 30 may communicate wirelessly with the display or user interface 32 using any wireless communication devices known in the art, such as a wireless antenna or transmitter communicating over Wi-Fi, Bluetooth, cellular signals, radio waves, or any wireless communication standards known in the art.

In use, neutrons emitted from a source, such as radioactive material, impinge one or more of the $^{10}$B coatings 22 on the piezoelectric substrates 16. As a result of neutron reception, energy may be transferred from the $^{10}$B coatings 22 to the piezoelectric substrates 16 in the form of a crystal dislocation in the piezoelectric substrates 16. The piezoelectric substrates 16, in turn, may convert this mechanical energy into a detectable electrical signal, such as a voltage applied to the conductive backplane 24. The characteristics of the electrical signal may correspond to the characteristics of the detected neutrons.

Figure 4:
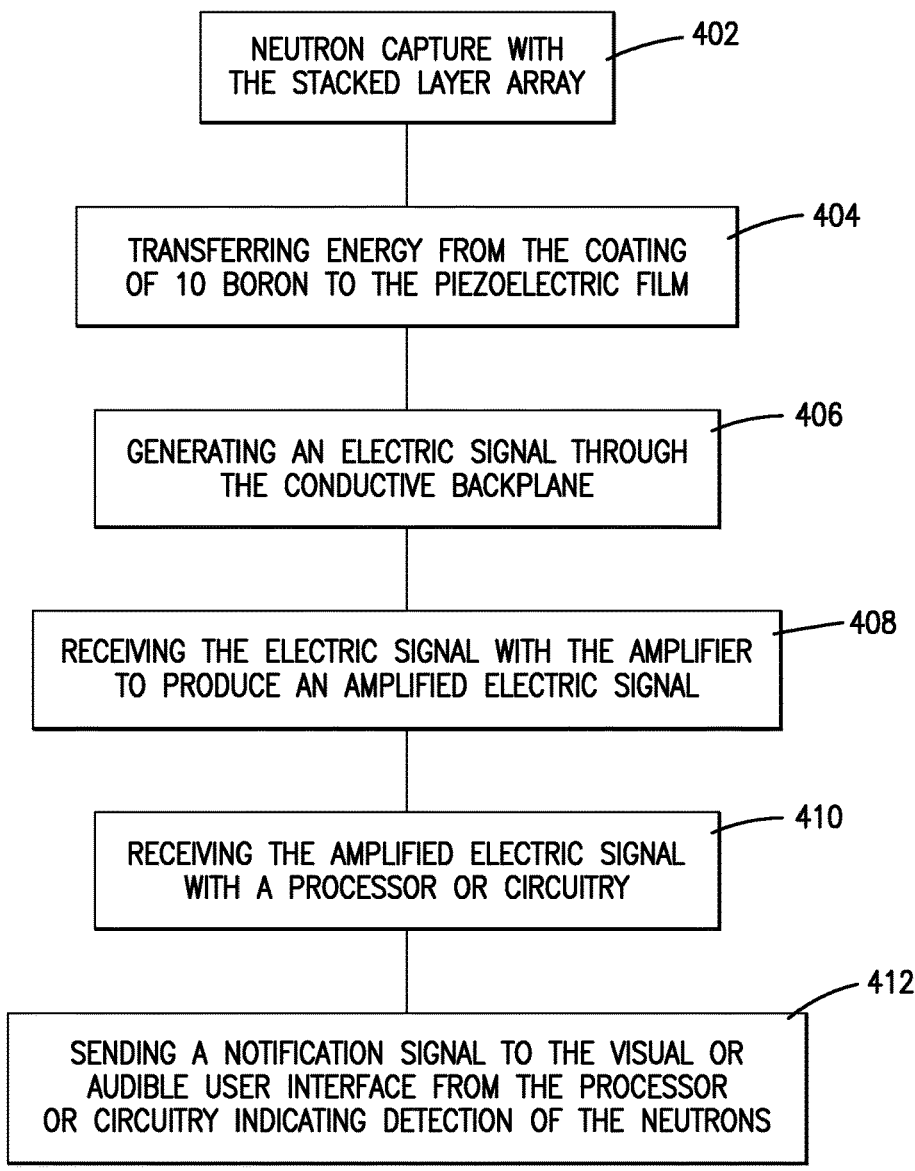
FIG. 4 is a flow chart illustrating a method of neutron detection in accordance with embodiments of the present invention.

Method steps for neutron detection will now be described in more detail, in accordance with various embodiments of the present invention. The steps of the method 400 may be performed in the order as shown in FIG. 4, or they may be performed in a different order. Furthermore, some steps may be performed concurrently as opposed to sequentially. In addition, some steps may not be performed.

The method 400 may include a step of receiving neutrons with the stacked layer array 26, as depicted in block 402. Specifically, the neutrons may strike one or more of the $^{10}$B coatings 22, creating a crystal dislocation in the piezoelectric substrate 16. Next, the method 400 may include the steps of transferring energy from the $^{10}$B coating 22 to the piezoelectric substrate 16 when neutrons strike the $^{10}$B coating 22, as depicted in block 404, and generating an electric signal through the conductive backplane 24 when energy is transferred from the $^{10}$B coating 22 to the piezoelectric substrate 16, as depicted in block 406. Specifically, when the neutrons strike the $^{10}$B coatings 22, the crystal dislocation of the piezoelectric substrate 16 may cause energy to be released, thereby producing an electric signal through the conductive backplane 24 of at least one of the coated substrates 12.

Next, the method 400 may include the steps of receiving the electric signal with the amplifier 28 to produce an amplified electric signal, as depicted in block 408, then receiving the amplified electric signal with the processor or circuitry 30, as depicted in block 410. The processor or circuitry 30 may calculate, filter, and/or process the amplified electric signal in any manner known in the art. Then, the method 400 may include a step of sending a notification signal to the user interface 32, from the processor or circuitry 30, as depicted in block 412. Specifically, the user interface 32 may visually or audibly indicate detection of the neutrons by the stacked layer array 26. Additionally or alternatively, the notification signal may be utilized by other systems or devices, such as indication technology known in the art. Specifically, coupling the neutron detecting system 10 described herein with identification technology for radioactive materials and the like may be beneficial in some applications.

Advantageously, the neutron detecting system 10 described herein is scalable and customizable. Specifically, any quantity and size of the coated substrate 12 may be used without departing from the scope of the invention, typically while using the same amplifier 28, processor and/or circuitry 30, and user interface 32 described above. Furthermore, the coated substrate 12 and/or the stacked layer array 26 may be conformed to a non-planar shape having at least one bend or curve. For example, the coated substrate 12 may be bent at a substantially 90-degree angle and/or wrapped around a cylinder, allowing for customization of the neutron detecting system 10 for a variety of applications.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A neutron detector comprising:
   a piezoelectric substrate comprised of a highly polarized polyvinylidene fluoride (PVDF) film and having a first surface and a second surface opposite of the first surface, wherein the piezoelectric substrate is configured to convert energy from one form to another via crystal dislocation in the PVDF film;
   a neutron-capture coating on the first surface, the coating configured to detect a presence of neutrons; and
   a conductive backplane in direct physical contact with the second surface, wherein the conductive backplane is homogeneous, wherein the conductive backplane carries an electric signal generated by the piezoelectric substrate when one or more neutrons strike the neutron-capture coating.

2. The neutron detector of claim 1, further comprising an anodized aluminum housing surrounding the substrate, the neutron-capture coating, and the conductive backplane.

3. The neutron detector of claim 1, wherein the conductive backplane is at least one of aluminum, copper, graphene/boron nitride, gold, and silver.

4. The neutron detector of claim 1, wherein the neutron-capture coating is a $^{10}$boron ($^{10}$B) coating.

5. The neutron detector of claim 1, further comprising a processor or circuitry electrically coupled to the conductive backplane.

6. The neutron detector of claim 5, further comprising a user interface or display configured to receive signals from the processor or circuitry indicating neutron detection.

7. The neutron detector of claim 5, further comprising at least one amplifier for amplifying electric signals received from the conductive backplane, wherein the amplifier is electrically coupled between the conductive backplane and the processor or circuitry.

8. The neutron detector of claim 5, wherein, when neutrons strike the neutron-capture coating, energy released is transferred to the piezoelectric substrate, producing an electrical signal carried by the conductive backplane to the processor or circuitry.

9. The neutron detector of claim 1, wherein the piezoelectric substrate, neutron-capture coating, and conductive backplane are conformed to a non-planar shape having at least one bend or curve.

10. A neutron detecting system, the system comprising:
    a stacked layer array comprising a plurality of coated substrates, wherein at least two of the coated substrates of the stacked layer array comprise:
      a piezoelectric substrate comprised of a highly polarized polyvinylidene fluoride (PVDF) film and having a first surface and a second surface opposite of the first surface,
      a coating of a $^{10}$boron ($^{10}$B) on the first surface, and
      a conductive backplane deposited in direct physical contact with the second surface, wherein the conductive backplane is homogeneous;
    at least one of a processor and circuitry electrically coupled to at least one of the conductive backplanes; and
    an anodized aluminum housing surrounding the stacked layer array and the at least one of the processor and the circuitry; and
    wherein, when neutrons strike the coating of $^{10}$B, energy released is transferred to the piezoelectric substrate causing crystal dislocation of the PVDF film, producing an electrical signal carried by the conductive backplane to the processor or the circuitry.

11. The neutron detector of claim 10, wherein the conductive backplane is at least one of aluminum, copper, graphene/boron nitride, gold, and silver.

12. The neutron detector of claim 10, wherein the coated substrates are stacked such that the coatings of $^{10}$B all face a first direction and the conductive backplanes all face a second direction, opposite of the first direction.

13. The neutron detector of claim 10, wherein at least one of the coated substrates comprises only the piezoelectric substrate and the conductive backplane on the second surface of the piezoelectric substrate, without the coating of $^{10}$B on the first surface.

14. The neutron detector of claim 10, further comprising a user interface or display configured to receive signals from the processor or the circuitry indicating neutron detection by the stacked layer array.

15. The neutron detector of claim 10, further comprising at least one amplifier electrically coupled to the at least one of the conductive backplanes and the processor or the circuitry, such that electricity flows from the at least one of the conductive backplanes to the at least one amplifier and is amplified prior to flowing to the processor or the circuitry.

16. A method of neutron detection, the method comprising:
    receiving neutrons with a stacked layer array comprising a plurality of coated substrates, wherein at least some of the coated substrates comprise:
        a piezoelectric substrate comprised of a highly polarized polyvinylidene fluoride (PVDF) film and having a first surface and a second surface opposite of the first surface,
        a coating of a $^{10}$boron ($^{10}$B) on the first surface, and
        a conductive backplane deposited in direct physical contact with the second surface, wherein the conductive backplane is homogeneous;
    transferring energy from the coating of $^{10}$B to the piezoelectric substrate when neutrons strike the coating of $^{10}$B;
    generating an electric signal through the conductive backplane when energy is transferred from the coating of the $^{10}$B to the piezoelectric substrate causing crystal dislocation of the PVDF film;
    receiving the electric signal with at least one amplifier to produce an amplified electric signal;
    receiving the amplified electric signal with a processor or circuitry; and
    sending a notification signal to at least one of a visual or audible user interface from the processor or circuitry indicating detection of the neutrons with the stacked layer array.

17. The method of claim 16, wherein an anodized aluminum housing surrounds the stacked layer array to shield the stacked layer array from photons and gamma or alpha radiation, wherein the conductive backplane is at least one of aluminum, copper, graphene/boron nitride, gold, and silver.

* * * * *

UNITED STATES PATENT AND TRADEMARK OFFICE
CERTIFICATE OF CORRECTION

| | |
|---|---|
| PATENT NO. | : 10,024,987 B2 |
| APPLICATION NO. | : 14/600225 |
| DATED | : July 17, 2018 |
| INVENTOR(S) | : Christopher A. Boese and George Bohnert |

It is certified that error appears in the above-identified patent and that said Letters Patent is hereby corrected as shown below:

In the Specification

Column 1, Line 2, add:
-- STATEMENT REGARDING FEDERALLY-SPONSORED RESEARCH OR DEVELOPMENT
This invention was made with government support under Contract No.: DE-NA0000622 awarded by the Department of Energy. The government has certain rights in the invention. --

Signed and Sealed this
Twenty-first Day of April, 2020

Andrei Iancu
*Director of the United States Patent and Trademark Office*